United States Patent
Grund et al.

(10) Patent No.: US 7,611,683 B2
(45) Date of Patent: Nov. 3, 2009

(54) APPARATUS AND PROCESS FOR THE CONTINUOUS REACTION OF A LIQUID WITH A GAS OVER A SOLID CATALYST

(75) Inventors: Gerda Grund, Dülmen (DE); Stefan Jelko, Haltern am See (DE); Wilfried Büschken, Haltern am See (DE); Udo Peters, Marl (DE)

(73) Assignee: OXENO Olefinchemie GmbH, Marl (DE)

( * ) Notice: Subject to any disclaimer, the term of this patent is extended or adjusted under 35 U.S.C. 154(b) by 831 days.

(21) Appl. No.: 11/117,335

(22) Filed: Apr. 29, 2005

(65) Prior Publication Data

US 2005/0256281 A1    Nov. 17, 2005

(30) Foreign Application Priority Data

Apr. 29, 2004    (DE) .................. 10 2004 021 128

(51) Int. Cl.
*C08F 2/00* (2006.01)
*B01J 8/02* (2006.01)

(52) U.S. Cl. .................. 422/211; 422/215; 422/220; 422/224; 585/250; 585/265; 585/275; 585/277

(58) Field of Classification Search .............. 422/129, 422/188, 190, 192, 193–195, 224, 225, 229, 422/239; 366/314, 336
See application file for complete search history.

(56) References Cited

U.S. PATENT DOCUMENTS

| | | | |
|---|---|---|---|
| 4,140,625 A * | 2/1979 | Jensen ..................... 208/146 |
| 6,015,928 A | 1/2000 | Gubisch et al. |
| 6,184,424 B1 | 2/2001 | Bueschken et al. |
| 6,239,318 B1 | 5/2001 | Schuler et al. |
| 6,331,657 B1 | 12/2001 | Kaizik et al. |
| 6,403,836 B2 | 6/2002 | Kaizik et al. |
| 6,407,295 B1 | 6/2002 | Kaizik et al. |
| 6,482,992 B2 | 11/2002 | Scholz et al. |
| 6,492,564 B1 * | 12/2002 | Wiese et al. .................. 568/451 |
| 6,500,991 B2 | 12/2002 | Wiese et al. |
| 6,555,716 B2 | 4/2003 | Protzmann et al. |
| 6,570,033 B2 | 5/2003 | Rottger et al. |
| 6,627,782 B2 | 9/2003 | Kaizik et al. |
| 6,680,414 B2 | 1/2004 | Knoop et al. |
| 6,720,457 B2 | 4/2004 | Drees et al. |
| 6,818,770 B2 | 11/2004 | Selent et al. |
| 6,924,389 B2 | 8/2005 | Jackstell et al. |
| 6,956,133 B2 | 10/2005 | Jackstell et al. |
| 6,960,699 B2 | 11/2005 | Totsch et al. |
| 7,009,068 B2 | 3/2006 | Schmutzler et al. |
| 7,109,346 B2 | 9/2006 | Beller et al. |
| 2002/0063344 A1 * | 5/2002 | Pagade ..................... 261/94 |
| 2002/0127160 A1 | 9/2002 | Harter et al. |
| 2002/0159930 A1 * | 10/2002 | Zehner et al. .............. 422/193 |
| 2004/0236133 A1 | 11/2004 | Selent et al. |
| 2004/0238787 A1 | 12/2004 | Wiese et al. |
| 2004/0242947 A1 | 12/2004 | Beller et al. |
| 2005/0043279 A1 | 2/2005 | Selent et al. |
| 2005/0182277 A1 | 8/2005 | Totsch et al. |
| 2005/0209489 A1 | 9/2005 | Moller et al. |
| 2005/0234270 A1 | 10/2005 | Kaizik et al. |
| 2006/0036121 A1 | 2/2006 | Kaizik et al. |
| 2006/0128998 A1 | 6/2006 | Lueken et al. |
| 2006/0129004 A1 | 6/2006 | Lueken et al. |
| 2006/0161017 A1 | 7/2006 | Grass et al. |
| 2006/0183936 A1 | 8/2006 | Grass et al. |
| 2006/0241324 A1 | 10/2006 | Moeller et al. |

FOREIGN PATENT DOCUMENTS

| | | | |
|---|---|---|---|
| WO | WO 00/53307 | | 9/2000 |
| WO | WO 03/008519 | * | 1/2003 |
| WO | WO 2005/014161 A1 | | 2/2005 |

OTHER PUBLICATIONS

Park, J. et al. (1995). "Solubilities of Hydrogen in Heavy Normal Paraffins at Temperatures from 323.2 to 423.2 K and Pressures to 17.4 MPa." Journal of Chemical and Engineering Data, 40, pp. 241-244.*

(Continued)

*Primary Examiner*—Robert J Hill, Jr.
*Assistant Examiner*—Brian McCaig
(74) *Attorney, Agent, or Firm*—Oblon, Spivak, McClelland, Maier & Neustadt, L.L.P.

(57) ABSTRACT

A reactor, which is capable of accommodating a reaction in which at least three phases are present and at least one gaseous starting material and at least one liquid starting material are reacted in cocurrent over a fixed-bed catalyst to give one or more product(s), contains at least one first zone in which a catalyst is present as a fixed bed; and at least one second zone whose size corresponds to a reactor cross section and which is separated from the at least one first zone by a distributor plate provided with at least one hole and in which at least one liquid and at least one gaseous starting material enter the reactor. The distributor plate is provided with at least one static mixer which is located in the at least one hole on at least one side of the distributor plate.

20 Claims, No Drawings

OTHER PUBLICATIONS

Lal, D. et al. (1999). "Solubility of hydrogen in Athabasca bitumen." Fuel, 78, pp. 1437-1441.*

Dudukovic, M. et al. (2002). "Multiphase catalytic reactors: a perspective on current knowledge and future trends." Catalysis Reviews, 44, 1, pp. 123-246.*

Atkins, P.W. (1994). Physical Chemistry, 5th ed. W.H. Freeman and Co.*

Bond, G.C. et al. (1996). "Catalytic hydrogenation in the liquid phase. Part 1. Hydrogenation of isoprene catalysed by palladium, palladium-gold, and palladium-silver catalysts." Journal of Molecular Catalysis A: Chemical, 109, pp. 261-271.*

Boitiaux, J.P. et al. (1987). "Hydrogenation of unsaturated hydrocarbons in the liquid phase on Pd, Pt, and Rh catalysts III. Quantitative Selectivity Ranking" Applied Catalysis, 35, 2, pp. 193-209.*

Yoon, C. et al. (1997). "Hydrogenation of 1,3-butadiene on Pt surfaces of different structures." Catalysis Letters, 46, 37-41.*

Ardiaca, N.O. et al. (2001). "Kinetic study of the liquid-phase hydrogenation of 1,3-butadiene and n-butenes on a commercial Pd/alumina catalyst." Studies in Surface Science and Catalysis, 133, pp. 527-534.*

U.S. Appl. No. 12/065,091, filed Feb. 28, 2008, Hess, et al.
U.S. Appl. No. 11/574,063, filed Feb. 22, 2007, Nierlich, et al.
U.S. Appl. No. 11/494,741, filed Jul. 28, 2006, Kaizik, et al.
U.S. Appl. No. 10/562,454, filed Aug. 18, 2006, Krissmann, et al.
U.S. Appl. No. 10/576,302, filed Apr. 19, 2006, Kaizik, et al.
U.S. Appl. No. 10/588,762, filed Aug. 8, 2006, Wiese, et al.
U.S. Appl. No. 10/593,330, filed Sep. 19, 2006, Borgmann, et al.
U.S. Appl. No. 10/584,492, filed Jun. 22, 2006, Ortmann, et al.
U.S. Appl. No. 10/584,148, filed Jun. 22, 2006, Ortmann et al.

* cited by examiner

APPARATUS AND PROCESS FOR THE CONTINUOUS REACTION OF A LIQUID WITH A GAS OVER A SOLID CATALYST

BACKGROUND OF THE INVENTION

1. Field of the Invention

The present invention relates to a process in which a liquid and a gas are reacted continuously and/or semicontinuously over a fixed-bed catalyst in a reactor through which the reactants are passed in cocurrent and which is equipped with a specific mixing and distribution device for the starting materials.

2. Discussion of the Background

Reactions in which three phases, viz. gas, liquid and solid, participate occur frequently in industrial chemistry. In most cases, the catalyst is present as a solid and the reactants are distributed over the gas and liquid phases. If the reaction occurs on the catalytic surface of the solid, the reaction rate is influenced both by mass transfer between gas and liquid and that between liquid and solid. The mass transfers and the chemical reactions are to be regarded as steps occurring in succession. Each of these steps can be the rate-determining step.

Complex reaction networks frequently occur in chemical processes. Both parallel and subsequent reactions can then proceed simultaneously. In such processes, the selectivity to the target product plays a particularly important role. The conversion and selectivity to the target product depend not only on the reaction kinetics (dependent on, inter alia, the temperature and the pressure) but also on the hydrodynamics of the chosen reactor.

The three-phase reactors used industrially differ essentially in the way in which the phases move. Thus, a distinction is made between suspension reactors (stirred vessel or bubble column), fluidized beds and fixed beds (liquid-filled reactor or trickle-bed reactor).

In a fixed-bed reactor, the catalyst is present in the form of a bed of packing. With regard to the mode of operation, a distinction is made here between a liquid-filled reactor and a trickle-bed reactor. In the trickle-bed reactor, the flow velocity of the liquid phase is low. The reaction gas is conveyed through the reactor from the bottom upward in cocurrent or countercurrent to the liquid phase (Baerns, Hofmann, Renken "Chemische Reaktionstechnik", Georg Thieme Verlag Stuttgart, 1999, pp. 264-267).

In a three-phase reactor (known as a three-phase trickle-bed reactor), the liquid phase is conveyed from the top downward. The gas phase can flow in the same direction as the liquid phase or in the opposite direction. It is usual to convey both phases (gas and liquid) from the top downward in cocurrent. Three-phase reactors can be operated in various modes, as described below. Depending on the liquid and gas velocities selected, different types of operation are established. At low liquid velocities, the liquid trickles downward in thin films and the likewise relatively low downward-directed gas flow is continuous, resulting in "trickle flow". When the gas velocity increases and the liquid velocity remains at the same relatively low value, the reactor operates in the "spray flow" region. In contrast, if the gas velocity remains relatively low at a significantly increased liquid velocity, "bubble flow" occurs. If the velocities of the two phases are increased simultaneously, "pulse flow" is obtained. These modes of operation have very very characteristic and very different hydrodynamic parameters which have, in particular, an influence on the mass transfer. The conversion and the selectivities of reactions which can be carried out in three-phase reactors depend on the kinetics, the pressure, the temperature and the hydrodynamics of the reactor (Ullmann's Encyclopedia of Industrial Chemistry, Vol. B4, pp. 309-320).

In industrial reactors whose diameter is correspondingly large, the distribution of the starting materials (liquid (starting material 1), gas (starting material 2)) over the total cross section of the catalyst bed plays a critical role. Reactions in which the gas is soluble in the liquid to only a limited extent and the reaction takes place exclusively between the liquid phase and the solid catalyst present an additional challenge. In these cases, the starting material 2 has to be transported from the gas phase into the liquid simultaneously with the progress of the reaction (in the liquid phase). This requires both liquid and gas to be present in sufficient amounts at all places in the reactor, i.e. both reactants have to be distributed optimally both in the radial direction and in the axial direction. In such cases, attempts are made to achieve uniform flow velocities over the entire cross-sectional area of the reactor.

Furthermore, three-phase reactors are usually operated adiabatically, i.e. the temperature alters as the conversion progresses as a result of the heat of reaction which is liberated or taken up and, due to the absence of external heat exchange, increases or drops correspondingly. To achieve a homogeneous temperature distribution in the reactor, a uniform distribution of the starting materials is likewise desirable.

To achieve very good mixing of the starting materials and at the same time a uniform distribution of these over the catalyst surface, various measures have been employed in industry. An inert layer consisting of packing elements, e.g. Raschig rings or spheres, which is intended to ensure uniform distribution of the liquid and the gas phase over the catalyst cross section can be installed above the catalyst.

Another possibility is to carry out the distribution of the starting materials onto the uppermost layer of the catalyst by means of distributor plates, for example perforated plates. A combination of the two abovementioned engineering measures is likewise possible.

U.S. Pat. Nos. 5,882,610 and 6,093,373 describes a mixing and distribution system which comprises a perforated plate in which each hole is provided with an upward-directed tube having lateral drilled holes and a free space between perforated plate and catalyst bed. The space between catalyst and perforated plate has a height of from 0 to 10 cm. The diameter of the tubes is equal to or smaller than half the distance between perforated plate and catalyst bed. The number of tubes per square meter is from 100 to 700. The gas phase and the liquid phase are mixed in the tubes and in the intermediate space before flowing through the catalyst bed. It is stated that the mixing of gas and liquid and the uniformity of the flow of the starting materials onto the catalyst surface are improved by means of the apparatus claimed. However, examples of an effect in carrying out chemical reactions are not given. The height of the reactors used is in each case 4 m at a diameter of 400 mm.

A high ratio of the length of the reactor or length of the reaction zone to the diameter is typical of three-phase reactors. In general, a ratio of greater than 5, preferably from 5 to 25, is proposed for this type of reactors (Ullmann's Encyclopedia of Industrial Chemistry, Vol. B4, p. 310).

DISCUSSION OF THE BACKGROUND

It is an object of the present invention to provide a three-phase reactor which can be operated even at a length-to-diameter ratio of the reactor of less than 5. The length-to-diameter ratio is defined as the ratio of the length of the reaction zone (catalyst packing) to the diameter of the reaction zone (reactor diameter). The above three-phase reactor should overcome the need for the reactor to have a large height even when the reactor is designed for a high capacity (by increasing the diameter of the reactor), since tall reactors place, inter alia, particular demands on the structural strength.

This and other objects have been achieved by the present invention the first embodiment of which includes a reactor, comprising:

at least one first zone in which a catalyst is present as a fixed bed; and at least one second zone whose size corresponds to a reactor cross section and which is separated from said at least one first zone by a distributor plate provided with at least one hole and in which at least one liquid and at least one gaseous starting material enter said reactor;

wherein said distributor plate is provided with at least one static mixer which is located in said at least one hole on at least one side of the distributor plate;

said reactor being capable of accommodating a reaction in which at least three phases are present and at least one gaseous starting material and at least one liquid starting material are reacted in cocurrent over a fixed-bed catalyst to give one or more product(s).

In another embodiment, the present invention relates to a process, comprising:

reacting at least one gaseous starting material and, at least one liquid starting material in the presence of a fixed bed catalyst in at least one reactor as described above;

wherein the starting materials are flowing in cocurrent through the reactor.

In yet another embodiment the present invention relates to a distributor plate, comprising:

holes in or on which at least one static mixer is located in such a way that when said distributor plate is used in a reactor, a reaction mixture has to pass through said at least one static mixer in order to get from one side of the distributor plate to the other side of the distributor plate.

DETAILED DESCRIPTION OF THE INVENTION

It has surprisingly been found that a reactor having a distributor plate which is located above the fixed-bed catalyst and is equipped with static mixers can achieve sufficiently good axial and radial distribution and mixing of the starting materials even at a length-to-diameter ratio of less than 5. It has also been found that in the reaction of a liquid with a gas over a fixed-bed catalyst through which the reactants flow in cocurrent, the selectivity to formation of the target product can be increased if the gas and the liquid are mixed/dispersed by means of a distributor plate provided with static mixers and are uniformly distributed over the catalyst surface.

The present invention accordingly provides a reactor for carrying out reactions in which at least three phases are present. At least one gaseous starting material and a liquid starting material are reacted in cocurrent over a fixed-bed catalyst to give a product. The reactor has at least one zone in which the catalyst is present as a fixed bed and a zone whose size corresponds to the reactor cross section and which is separated from the first zone(s) by a distributor plate provided with holes. The liquid and gaseous starting materials enter the reactor in the zone whose size corresponds to the reactor cross section. The distributor plate is provided with static mixers which are located in the holes on at least one side of the distributor plate.

The present invention likewise provides a process in which at least three phases are present in the reactor according to the present invention. At least one starting material is gaseous, one starting material is liquid. The catalyst is present in a fixed bed and the starting materials flow in cocurrent through the reactor.

The reactor of the present invention has the advantage that a sufficiently good starting material distribution can be achieved in the three-phase reactor regardless of the complexity of the reaction to be carried out, regardless of the selected mode of operation of the process in the three-phase reactor ("spray flow", "bubble flow", "trickle flow" or "pulse flow") and regardless of the solubility of the gas in the reaction mixture. The reactor of the present invention can also be employed, and is particularly useful, when reaction networks are present. The good starting material distribution is also achieved in reactors having relatively low length-to-diameter ratios (i.e. large diameters). The selectivities achieved in the reactions (processes) carried out using a reactor according to the present invention having a length-to-diameter ratio of less than 5 preferably correspond to those of reactions carried out in reactors having a length-to-diameter ratio of greater than 5.

The reactor of the present invention simplifies the scale-up from laboratory experiments to large industrial plants, since it is no longer necessary to use reactors having a length-to-diameter ratio of greater than 5. Reactors leaving a length-to-diameter ratio of greater than 5 so far needed to be very tall or a plurality of smaller reactors had to be operated in parallel in order to achieve high throughputs.

Depending on the reaction carried out, the use of the reactor of the present invention even makes it possible to achieve improved selectivities to the target product despite a significant increase in the reactor diameter.

For the purposes of the present invention, the term "liquid" refers to a substance or mixture of substances which is present in the liquid state in the reactor under reaction conditions and comprises at least one starting material. The term "gas" refers to a pure gas or a gas mixture which comprises at least one starting material and optionally an inert gas. An example of a gas comprising two starting materials is synthesis gas, which is used in hydroformylation reactions.

The reactor of the present invention and the process of the present invention will be described below by way of example, without the present invention being restricted to these illustrated embodiments. If ranges, general formulae or classes of compounds are indicated below, these encompass not only the corresponding ranges or groups of compounds which are explicitly mentioned but also all other subranges and subgroups of compounds which can be obtained by leaving out individual values (ranges) or compounds.

The present invention provides a reactor for carrying out reactions in which at least three phases are present. At least one gaseous starting material and a liquid starting material are reacted in cocurrent over a fixed-bed catalyst to give a product. The reactor has at least one zone in which the catalyst is present as a fixed bed and a second zone whose size corresponds to the reactor cross section and which is separated from the first zone(s) by a distributor plate provided with holes. The liquid and gaseous starting materials enter the reactor in the second zone. The distributor plate is provided with static mixers which are located in the holes on at least one side of the distributor plate. The static mixers can be welded onto the holes or be welded into the holes.

The distributor plate according to the present invention in the reactor has holes in or on which the static mixers are located in such a way that a reaction mixture has to pass through at least one static mixer in order to get from one side of the distributor plate to the other side of the distributor plate. In one embodiment, the starting materials or the entire reaction mixture are not able to get through the distributor plate without having to pass through a static mixer. It can be advantageous for not just one distributor plate but a plurality of distributor plates to be present in the reactor of the present invention. In this case, a plurality of distributor plates can be present above the fixed-bed catalyst. It is also possible for a plurality of fixed-bed catalysts (reaction zones) to be present in the reactor and a distributor plate according to the present invention can be present upstream of each such zone.

In one illustrated embodiment of the reactor of the present invention, the reactor has two of the distributor plates according to the present invention in the flow direction and has the following structure: 1st empty space, 1st distributor plate with static mixers, 1st catalyst bed, 2nd empty space, 2nd distributor plate with static mixers, 2nd catalyst bed, (optionally 3rd empty space). The starting materials are preferably fed into the first empty space. In the second empty space after the first catalyst bed, it is possible, if required, to feed in liquid and/or gas as starting materials or solvent or inert gas or to take off part of the reaction mixture. If a third empty space is present, the reaction mixture is taken off from the reactor in this.

The distributor plate can be present directly (without a spacing) upstream of the reaction zone. It is likewise possible for a space to be provided between the distributor plate and the fixed-bed catalyst zone (reaction zone). A space of this type preferably has a height of from 0.1 to 20% of the height of the downstream reaction zone. The height includes all values and subvalues therebetween, especially including 0.5, 1, 1.5, 2, 3, 4, 5, 6, 7, 8, 9, 10, 11, 12, 13, 14, 15, 16, 17, 18 and 19% of the height of the downstream reaction zone. The space can be without internals or have an inert bed of packing elements which does not undergo any chemical reaction with any of the components present in the reaction mixture. The height of the inert bed (bed of packing elements) is preferably from 0.1 to 500 mm, in particular from 100 to 300 mm. The height of the inert bed includes all values and subvalues therebetween, especially including 1, 5, 10, 15, 20, 30, 50, 100, 150, 200, 250, 300, 350, 400 and 450 mm. As packing elements, it is possible to use commercial, disordered packing elements, e.g. cylinders, spheres, rings, etc., of an inert material. For example, the packing elements Interpack 15 mm from VFF can be used.

The number of static mixers is preferably from 70 to 500, preferably from 120 to 280, per square meter of the reactor cross section or the distributor plate. The number of static mixers includes all values and subvalues therebetween, especially including 80, 90, 100, 150, 200, 250, 300, 350, 400 and 450. The static mixers are preferably distributed uniformly over the distributor plate. They are preferably arranged so that three neighboring static mixers are arranged in the shape of an equilateral triangle.

It is possible to use distributor plates having static mixers of different constructions in the reactor of the present invention. Static mixers which can be used can be procured, for example, from the companies Kenics, Koch or Sulzer.

The static mixers installed on/in a particular distributor plate should all have the same effect, namely optimal dissolution of the gas in the liquid, uniform mixing of the phases and uniform distribution of the mixture over the entire cross section of the reactor or fixed-bed catalyst. For this purpose, it is advantageous to install static mixers of the same construction and the same dimensions on a particular distributor plate. Static mixers of different dimensions/constructions can optionally be used in the edge zones. If more than one distributor plate is present in the reactor, the distributor plates can have identical or different static mixers.

The diameter of the static mixers depends on the required superficial velocity in the reactor and the desired bubble size. For example, at a superficial velocity of the liquid of from 80 to 600 $m^3/m^2/h$, from 60 to 250 static mixers smaller than or equal to DN25, preferably DN20, per square meter of reactor cross sectional area are appropriately used. The superficial velocity includes all values and subvalues therebetween, especially including 100, 150, 200, 250, 300, 350, 400, 450, 500 and 550 $m^3/m^2/h$. The number of static mixers includes all values and subvalues therebetween, especially including 80, 100, 120, 140, 160, 180, 200, 220 and 240.

The static mixers are preferably arranged uniformly, for example in squares or in a diamond pattern. Other patterns are possible too. Particular preference is given to an arrangement in which three adjacent static mixers form an equilateral triangle, i.e. neighboring static mixers are the same distance apart. The distance between two adjacent static mixers (from center point to center point) is preferably from 50 to 120 mm, more preferably from 60 to 90 mm. The distance between two adjacent static mixers includes all values and subvalues therebetween, especially including 60, 70, 80, 90, 100 and 110 mm. The number of static mixers per square meter is preferably from 20 to 500, more preferably from 100 to 280. The number of static mixers per square meter includes all values and subvalues therebetween, especially including 50, 100, 150, 200, 250, 300, 350, 400 and 450.

The static mixers are integrated into the distributor plate in such a way that after installation of the distributor plate in the reactor they project both downward and upward from the distributor plate or are flush with the distributor plate.

The reactor of the present invention can, for example, be a vessel in the form of a column. The cross section of the reactor can be triangular, rectangular, square, polygonal, elliptical or preferably circular. The reactor particularly preferably has a length-to-diameter ratio of less than 5, preferably less than 3. The length-to-diameter ratio is defined as above as the ratio of the height of the reaction zone to the diameter of the reaction zone. In the case of a noncircular reactor cross section, an effective diameter d is calculated from the cross-sectional area as the diameter of a circle having the same cross-sectional area. Due to the relatively low length-to-diameter ratio, it is possible to use reactors having diameters of up to 5 m, preferably diameters of from 1 to 3 m, for carrying out three-phase reactions.

The reactor of the present invention can be used in all modes of operation of a three-phase reactor. The reactor of the present invention is particularly suitable for carrying out a multiphase process in which at least three phases are present in the reactor and at least one starting material is gaseous, one starting material is liquid and the catalyst is present in a fixed bed and the starting materials flow through the reactor in cocurrent, with at least one reactor according to the present invention being used in the process. The flow through the reactor is particularly preferably in cocurrent from the top downward.

The process of the present invention is particularly preferably carried out so that the mean Sauter diameter of the gas bubbles dispersed in the liquid after exit from the static mixers is less than 5 mm, preferably less than 3 mm and particularly preferably less than 1 mm.

Various types of reaction occurring between a liquid and a gas over a fixed-bed catalyst, e.g. oxidations, epoxidations of olefins (e.g. propylene with hydrogen peroxide), carbonylations, hydroformylations, aminations, ammonoxidations, oximations and hydrogenations, can be carried out in a reactor according to the present invention. All these processes carried out in a reactor according to the present invention are likewise provided by the present invention.

The process of the present invention is particularly preferably a selective reaction between a liquid and a gas. Selective reactions which can be carried out with the aid of the apparatus according to the present invention are, for example, the following selective hydrogenations:

preparation of olefins from acetylene derivatives,
preparation of olefins having at least one isolated double bond from conjugated olefins,
preparation of saturated ketones from unsaturated ketones,
preparation of saturated aldehydes from unsaturated aldehydes, and
preparation of saturated nitrites from unsaturated nitrites.

The process of the present invention is very particularly preferably a hydrogenation or hydroformylation.

The process of the present invention can be used, in particular, for carrying out reactions in which the solubility of the gas used as starting material in the liquid used as starting material under the reaction conditions is insufficient to bring about the required conversion of the reactants.

The process of the present invention can be carried out in one or more reactors of which at least one is a reactor according to the present invention. When the reaction is carried out in a plurality of reactors, these are connected in series or in parallel or both in series and in parallel. When a plurality of reactors are connected in parallel, it has to be ensured that the reaction mixture passes at least once through a reactor according to the present invention. The individual reactors are operated in a single pass or with recirculation of part of the reactor output (recycle mode).

An example of a process according to the present invention is a process for reacting a liquid with a gas over a heterogeneous catalyst in a fixed-bed reactor through which the reactants flow in cocurrent, which process gives improved selectivities to the target product in cases where reaction networks occur, despite the significant increase in the reactor diameter.

According to the present invention, the reaction of a gas with a liquid is carried out in a reactor which has at least two chambers as a result of being divided by at least one distributor plate having static mixers. The feeds, viz. gas and liquid, fed into the first chamber can reach the second chamber in which the fixed bed of catalyst is located only via the static mixers. At the end of the catalyst zone, one, two or more facility/facilities for taking off the reaction mixture or for taking off the liquid and the gas from the reaction mixture are either located directly after the reaction zone or there is at least one further chamber which is located downstream of the catalyst zone and from which the reaction mixture is, either as the total mixture or as separate gas and liquid, removed from the reactor or transferred via a further distributor plate which can likewise have static mixers into a further reaction zone, with part of the reaction mixture being able to be removed from this chamber or further starting materials being able to be fed into this chamber.

The process of the present invention can be used, in particular, for carrying out reactions which are to be carried out selectively. In such reactions, it is important that not only an appropriate conversion but also, in particular, a high selectivity to the target product be achieved, i.e. the proportion of the desired product is high compared to the other products which are formed in subsequent and/or parallel reactions.

In the case of reactions which are strongly exothermic or endothermic, heat transport limitations can occur in addition to mass transfer limitations in a three-phase system. It is therefore important to optimize external and/or internal transport processes and to create effectively isothermal conditions between the phases. The reactor of the present invention with its novel distributor plates makes a major contribution to maintaining the radial and axial distribution of the reactants which is required for mass and heat transport.

The process of the present invention is described below by way of example with the aid of a specific embodiment. The specific embodiment of the process of the present invention relates to carrying out the selective hydrogenation of butadienes to 1-butene or to 2-butenes or to a mixture of linear butenes. In this embodiment, butadiene or butadiene-containing streams are hydrogenated to linear butenes or mixtures comprising linear butenes.

As liquid-phase starting materials, it is possible to use industrial $C_4$ fractions, e.g. $C_4$ fractions from a steam reformer or an FCC unit (fluid catalytic cracker), which may comprise multiply unsaturated hydrocarbons such as butadiene and acetylene derivatives, simple olefins such as 1-butene, 2-butenes, i-butene and also saturated hydrocarbons such as i-butane and n-butane.

Depending on its origin, the liquid starting material used can comprise from 5 to 100% by weight, in particular from 30 to 75% by weight and very particularly preferably from 30 to 60% by weight, of multiply unsaturated hydrocarbons. The amount of multiply unsaturated hydrocarbons includes all values and subvalues therebetween, especially including 10, 20, 30, 40, 50, 60, 70, 80 and 90% by weight. For example, the 1,3-butadiene content of the $C_4$ fraction from a steam cracker is frequently about 45% by weight. If desired, pure butadiene can, if it is available at a low cost, be hydrogenated selectively to n-butenes by means of the process of the present invention. The hydrocarbon feed mixture can be used dry or, if appropriate, moist.

To achieve a high selectivity to formation of linear butenes, it can be advantageous to limit the concentration of multiply unsaturated hydrocarbons, predominantly 1,3-butadiene, in the feed stream. The feed stream concentrations of multiply unsaturated $C_4$ compounds in the liquid phases should preferably be less than 20% by weight, more preferably from 5 to 15% by weight and particularly preferably from 5 to 10% by weight. In the case of the feed streams having a higher concentration, the concentration can be reduced by addition of a solvent. As solvents, it is possible to use the cooled outputs from the various reactors, in particular that of the same reactor, i.e. preference is given to operating the reactor in the recycle mode. However, it is also possible for dilution to be carried out using other solvents which are free of or low in multiply unsaturated hydrocarbons. For example, Raffinate I, which is a virtually butadiene-free $C_4$-hydrocarbon stream, could be used. The liquid feed stream is particularly preferably mixed with a further stream before entry into the first reactor so as to give a butadiene-containing stream which contains less than 20% by weight of butadiene, preferably less than 10% by weight, more preferably less than 5% by weight and most preferably less than 1% by weight of butadiene.

When a concentration of multiply unsaturated hydrocarbons in the feed stream of less than 20% by weight is adhered to, the butadiene present in the feed stream can be hydrogenated to butenes with higher selectivity. The butene selectivity ($S_{butenes}$) is defined as follows:

$$S{butenes} = \frac{\text{conversion into butenes}}{\text{total conversion of butadiene}} * 100$$

and can in this way reach values of at least 97%.

The selective butadiene hydrogenation is preferably carried out using supported catalysts which comprise at least one metal of transition group eight of the Periodic Table of the Elements as active component and a support material. A preferred metal is palladium. The metal concentration in the supported catalyst is preferably from 0.1 to 2.0% by weight, more preferably from 0.2 to 1.0% by weight. The metal concentration in the supported catalyst includes all values and subvalues therebetween, especially including 0.2, 0.3, 0.4, 0.5, 0.6, 0.7, 0.8, 0.9, 1, 1.1, 1.2, 1.3, 1.4, 1.5, 1.6, 1.7, 1.8 and 1.9% by weight. Support materials which can be used are, for example, MgO, $Al_2O_3$, $SiO_2$, $TiO_2$, $SiO_2/Al_2O_3$, $CaCO_3$ or activated carbon. Preferred support materials are $Al_2O_3$ and $SiO_2$. In particular, the hydrogenation is carried out using coated catalysts, i.e. the hydrogenation-active substances are present in the outer zone of the catalyst body. A palladium-containing catalyst is particularly preferably used as catalyst in the process of the present invention.

The catalysts are preferably used in a form in which they offer a low resistance to flow, e.g. in the form of granules, pellets or shaped bodies such as tablets, cylinders, spheres, extrudates or rings.

If more than one reactor or more than one reaction zone is used in the process of the present invention, identical or different catalysts can be used in the individual reactors or reaction zones.

The hydrogen used for the hydrogenation can be pure or can contain up to 50% by volume of inert gases (gases which neither react with the starting materials and/or the product nor alter the activity of the catalyst). The amount of inert gas includes all values and subvalues between 0 and 50% by volume, especially including 5, 10, 15, 20, 25, 30, 35, 40 and 45% by volume. Inert gases can be, for example, nitrogen or methane, but not carbon monoxide. The carbon monoxide content of the hydrogen should be in the region of a few ppm by volume, preferably less than 10 ppm, more preferably less than 5 ppm and most preferably less than 1 ppm by volume, because of the reduction in the catalyst activity which it frequently causes. Preference is given to using hydrogen having a purity of greater than 99.5% by volume in the process of the present invention.

In a preferred embodiment of the process of the present invention, the selective hydrogenation is preferably carried out at a temperature in the reaction zone of from 0 to 150° C., preferably from 25 to 80° C. The temperature includes all values and subvalues therebetween, especially including 10, 20, 30, 40, 50, 60, 70, 80, 90, 100, 110, 120, 130 and 140° C. When a plurality of reactors is used, these mean hydrogenation temperatures can be identical or different in these reactors.

The butadiene-containing stream used as starting material represents the liquid phase in the three-phase system. Such hydrogenations are therefore preferably carried out at a pressure of from 5 to 50 bar, more preferably from 5 to 30 bar and very particularly preferably from 5 to 20 bar. The pressure includes all values and subvalues therebetween, especially including 10, 15, 20, 25, 30, 35, 40 and 45 bar. The pressure in the reactors can be identical or different. The pressure, measured at the top of the reactors, is a function of the hydrogenation temperature, the ratio of the amount of hydrogen to that of feed mixture and also the proportion of multiply unsaturated compounds in the reactor feed.

The solubility of hydrogen in the $C_4$-hydrocarbon mixture is pressure-dependent: more hydrogen dissolves at a relatively high pressure than at a low pressure.

In a preferred embodiment of the process of the present invention for the selective hydrogenation of butadiene-containing streams, the amount of hydrogen supplied is less than that which would be necessary for complete hydrogenation of the multiply unsaturated compounds to the corresponding monoolefins. In the 1st reactor, from 0.1 to 0.9 times the stoichiometrically required amount of hydrogen is made available. The multiple of the stoichiometrically required amount of hydrogen includes all values and subvalues therebetween, especially including 0.2, 0.3, 0.4, 0.5, 0.6, 0.7 and 0.8 times. In the case of a two-stage plant, a stoichiometric deficiency of hydrogen is also set in the 2nd reactor. Preference is therefore given to less than the stoichiometrically required amount of hydrogen being fed in as gaseous starting material for the selective hydrogenation.

As stated above, the selective hydrogenation of the butadiene-containing stream, preferably the 1,3-butadiene-containing stream, can be carried out in one reactor according to the present invention or preferably in a plurality of reactors according to the present invention connected in series. The reactors can be operated adiabatically or polytropically.

The superficial velocities of the liquid phase can vary within a wide range. In particular, they can go significantly beyond the laminar flow region. Preferred superficial velocities at which the process of the present invention, in particular the selective hydrogenation of butadiene-containing streams, can be carried out are from 50 to 700 $m^3/m^2/h$, preferably from 100 to 450 $m^3/m^2/h$. The superficial velocity includes all values and subvalues therebetween, especially including 100, 150, 200, 250, 300, 350, 400, 450, 500, 550, 600, and 650 $m^3/m^2/h$. The superficial velocities can be identical or different in the various reactors when a plurality of reactors are present.

The dispersing action of the static mixers of the apparatus according to the present invention increases with increasing cross-sectional loading. If the amount of gas fed into the reactor is greater than that which is soluble in the liquid fed in, the size of the gas bubbles dispersed in the liquid (after leaving the mixer) can be controlled by means of the superficial velocity. It is in this case advantageous to set relatively high superficial velocities and high gas-to-liquid ratios, e.g. in the case of pulse flow. The dispersed gas bubbles preferably have mean calculated Sauter diameters (Klaus Sattler: Thermische Trennverfahren, 2nd edition, pp. 527-528, VCH-Verlag) in the range from 0.001 to 5 mm, preferably from 0.1 to 3 mm and particularly preferably from 0.1 to 1 mm, in the process of the present invention. The mean calculated Sauter diameter of the dispersed gas bubbles includes all values and subvalues therebetween, especially including 0.005, 0.01, 0.05, 0.1, 0.5, 1, 1.5, 2, 2.5, 3, 3.5, 4 and 4.5 mm.

Having generally described this present invention, a further understanding can be obtained by reference to certain specific examples which are provided herein for purposes of illustration only, and are not intended to be limiting unless otherwise specified.

EXAMPLES

Example 1

Comparative Example

The selective hydrogenation of the butadiene in a $C_4$ stream (for composition, see table 1) was carried out in a plant comprising a fixed-bed reactor. A supported palladium catalyst (0.1% by weight of Pd on $Al_2O_3$, from Degussa, product designation H14171) was present in the reactor. The catalyst bed was covered with an about 30 cm high bed of inert material (Interpak 15 mm, from VFF). The reactor had a ratio of the height of the fixed bed to the diameter of 2.6. It was operated as a recycle-mode reactor with its own cooled reactor output and a ratio of feed to circulating stream of about 15. A linear velocity of the liquid of about 332 m³/(m²*h) was established. The starting materials, viz. liquid $C_4$ and pure hydrogen, were introduced by means of cone-shaped distributor rings. The temperature at the reactor inlet was about 35° C., the pressure was 9 bar. A molar ratio of hydrogen to butadiene of 0.91 was set in the feed to the hydrogenation. Under the reaction conditions (temperature, pressure), the mole fraction of the hydrogen dissolved in the $C_4$ to the amount supplied was 20%. The composition of the output from the reactor is shown in column 2 of table 1. The butene selectivity achieved in the first reactor was 98.6% at a butadiene conversion of 88.4%. The required final conversion of butadiene occurred in the second reactor.

TABLE 1

Distribution of the $C_4$-hydrocarbons in the streams

|  | $C_4$ feed stream [% by weight] | Product of the 1ˢᵗ reactor [% by weight] |
|---|---|---|
| Butadiene | 48.2 | 5.6 |
| 1-Butene | 15.5 | 39.5 |
| cis-2-Butene | 3.3 | 11.7 |
| trans-2-Butene | 4.5 | 14.1 |
| Isobutene | 21.1 | 21.1 |
| Isobutane | 1.4 | 1.4 |
| n-Butane | 6.0 | 6.6 |

Example 2

According to the Present Invention

The plant for the selective hydrogenation of butadiene was enlarged so as to increase the capacity by a factor of 3.5. The selected ratio of the height of the fixed bed to the diameter of the reactor was 1.8, thus giving a 1.44-fold reduction in the length-to-diameter ratio. The reactor, which had a significantly greater diameter, was equipped with the distributor device of the present invention (139 static mixers per m², model ¾" KMS 4 from Kenics). A 30 cm high inert bed (Interpak 15 mm, from VFF) was installed between the distributor and the catalyst bed.

The plant with the reactor, which was configured as a recycle-mode reactor with cooled output and was charged with catalyst as described in example 1, was otherwise constructed analogously to the plant of the comparative example.

At a reactor inlet temperature in the reactor of 30° C., a pressure of 9.2 bar, a molar ratio of hydrogen to butadiene in the feed stream of 0.9, a ratio of feed to circulating stream of about 17, a linear velocity of the liquid of about 415 m³/(m²*h), the results shown in table 2 were achieved. The amount of hydrogen dissolved in the $C_4$ stream as a percentage of the amount supplied was 21% in the reactor. The achieved selectivity to butenes (target product) was 99.7% at a butadiene conversion of 88.1%. The required final conversion of the butadiene occurred in the 2nd reactor.

TABLE 2

Distribution of the $C_4$-hydrocarbons in the streams

|  | $C_4$ feed stream [% by weight] | Product of the 1ˢᵗ reactor [% by weight] |
|---|---|---|
| Butadiene | 47.8 | 5.7 |
| 1-Butene | 13.4 | 39.9 |
| cis-2-Butene | 3.9 | 8.2 |
| trans-2-Butene | 5.1 | 16.3 |
| Isobutene | 20.9 | 20.9 |
| Isobutane | 1.5 | 1.5 |
| n-Butane | 7.4 | 7.5 |

As comparison of the two examples shows, the same, even slightly improved, selectivity was able to be achieved at a comparable conversion by use of the reactor of the present invention with the novel distributor plates with static mixers despite a significant reduction in the length-to-diameter ratio. The improvement in the selectivity was achieved despite a significant increase in the reactor diameter. This leads to a significant improvement in the economics of the process.

German patent application 10 2004 021 128.0 filed Apr. 29, 2004, as well as all patents and articles mentioned above are incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. A reactor, comprising:
   at least one first zone in which a catalyst is present as a fixed bed; and
   at least one second zone whose size corresponds to a reactor cross section and which is separated from said at least one first zone by a distributor plate provided with at least one hole and in which at least one liquid and at least one gaseous starting material enter said reactor;
   wherein said distributor plate is provided with at least one static mixer which is located in said at least one hole on at least one side of the distributor plate;
   said reactor being capable of accommodating a reaction in which at least three phases are present and at least one gaseous starting material and at least one liquid starting material are reacted in cocurrent over a fixed-bed catalyst to give one or more product(s);
   wherein a length-to-diameter ratio of the reactor is 2.6 or less.

2. The reactor as claimed in claim 1, wherein the distributor plate comprises holes in or on which said at least one static mixer is located in such a way that a reaction mixture has to pass through said at least one static mixer in order to get from one side of the distributor plate to the other side of the distributor plate.

3. The reactor as claimed in claim 1, wherein the reactor has a length-to-diameter ratio of 1.8 or less.

4. The reactor as claimed in claim 1, wherein the number of static mixers per square meter of the reactor cross section is from 70 to 500.

5. The reactor as claimed in claim 1, wherein the number of static mixers per square meter of reactor cross section is from 120 to 280.

6. The reactor as claimed in claim 1, wherein the static mixers are uniformly distributed.

7. The reactor as claimed in claim 6, wherein three adjacent static mixers are arranged in the shape of an equilateral triangle.

8. The reactor as claimed in claim 1, which can be used in all modes of operation of a three-phase reactor.

9. A process, comprising:
reacting at least one gaseous starting material and, at least one liquid starting material in the presence of a fixed bed catalyst in at least one reactor as claimed in claim 1;
wherein the starting materials are flowing in cocurrent through the reactor.

10. The process as claimed in claim 9, wherein butadiene or at least one butadiene-containing stream is hydrogenated to linear butene or a mixture comprising linear butene.

11. The process as claimed in claim 10, wherein a butadiene-containing stream is used as liquid starting material which contains from 5 to 100% by weight of at least one multiply unsaturated olefin.

12. The process as claimed in claim 11, wherein a feed stream is mixed with a further stream before entry into a first reactor so as to give a butadiene-containing stream which contains less than 20% by weight of butadiene.

13. The process as claimed in claim 10, wherein less than the stoichiometrically required amount of hydrogen is fed in as gaseous starting material for the hydrogenation.

14. The process as claimed in claim 9, wherein a selective reaction between a liquid and a gas is carried out.

15. The process as claimed in claim 14, which is a hydrogenation.

16. The process as claimed in claim 9, wherein the starting materials flow through the reactor from the top downward.

17. The process as claimed in claim 9, which is carried out so that the mean Sauter diameter of gas bubbles dispersed in the liquid after exit from the static mixers is less than 5 mm.

18. The process as claimed in claim 9, wherein a mean Sauter diameter of the gas bubbles dispersed in the liquid after exit from the static mixers is less than 1 mm.

19. The process as claimed in claim 9, wherein a reaction is carried out in which a solubility of the gaseous starting material in the liquid starting material under the reaction conditions is insufficient to bring about a conversion of the starting materials.

20. The process as claimed in claim 9, wherein a palladium-containing catalyst is used.

* * * * *